United States Patent [19]

El Hamamsy

[11] 4,423,330

[45] Dec. 27, 1983

[54] NORMALLY OFF BILATERAL SWITCH

[75] Inventor: Mahoud A. El Hamamsy, Watchung, N.J.

[73] Assignee: Bell Telephone Laboratories, Incorporated, Murray Hill, N.J.

[21] Appl. No.: 305,131

[22] Filed: Sep. 24, 1981

[51] Int. Cl.³ .................... G02B 27/00; H03K 17/687
[52] U.S. Cl. ..................................... 250/551; 307/311
[58] Field of Search ............... 250/551, 208, 209, 578; 307/311, 571; 357/19

[56] References Cited

U.S. PATENT DOCUMENTS

| 3,321,631 | 5/1967 | Beard et al. | 307/311 |
| 4,303,831 | 12/1981 | El Hamamsy | 250/551 |
| 4,307,298 | 12/1981 | El Hamamsy et al. | 250/551 |

Primary Examiner—David C. Nelms
Assistant Examiner—Jere Jon Brophy
Attorney, Agent, or Firm—Richard D. Laumann

[57] ABSTRACT

A normally OFF linear bilateral switch using two VMOS FETs is described. The conduction state of the two VMOS FETs is controlled by a photodiode array optically coupled to a light emitting diode. A break-before-make switch may be constructed using this switch together with a normally ON JFET.

6 Claims, 4 Drawing Figures

NORMALLY OFF BILATERAL SWITCH

TECHNICAL FIELD

This invention relates generally to switches or opto-isolators and particularly to a photovoltaically controlled linear bilateral opto-isolator. In one embodiment of this invention, a linear bilateral normally OFF switch and a photovoltaically controlled normally ON switch form a break-before-make switch.

BACKGROUND OF THE INVENTION

Opto-isolators, which are commonly referred to as optically toggled switches, are useful devices because of the complete electrical isolation that they provide between an electrical input circuit and an electrical output circuit. An opto-isolator comprises a light source in an electrical input circuit and a photodetector in an electrical output circuit. The light source and photodetector are optically coupled to each other and the electrical output circuit changes its current conduction characteristics when the amount of light received by the photodetector changes.

Recently, optically toggled switches using a photodiode array which, upon illumination, produces a voltage that controls the current conduction state of a field effect transistor (FET) have been developed. One such switch uses a single photodiode array to control the current conduction state of a single normally ON JFET. For example, U.S. Patent application Ser. No. 154,856, filed on May 30, 1980 and assigned to the assignee of this invention, describes such a switch. Another such switch uses a photodiode array to control the current conduction state of a normally OFF vertical metal oxide semiconductor (VMOS) FET to form a linear unilateral switch. The structure and characteristics of VMOS FETs are described in *IEEE Transactions on Electron Devices*, pp. 1222-1228 and pp. 1229-1234, ED-25, October, 1978. If a linear bilateral switch is desired, the addition of a second VMOX FET, with the FET source electrodes connected to each other, yields such a switch.

While this switch is adequate for many applications, it has at least one drawback. For example, the two FETs are not readily integrable on a single chip because the source electrode of the VMOS FET is located on the top surface of the chip and consequently, connections between the two sources cannot be made on the chip itself. As a result, two VMOS FET chips are required.

An optically toggled normally OFF switch such as that just described can be usefully employed in many applications both by itself and with other types of switches. For example, many telephony applications require voltages of different magnitudes and it is often undesirable to have the larger voltage applied to the circuit that carries the smaller voltage. One such telephony application arises because the ringing voltage is commonly 105 volts and the tone generator is commonly 48 volts. It is desirable to break the circuit between the station apparatus and the central office tone generator before the ringing voltage is applied to the station apparatus so that the ringing voltage never reaches the tone generator circuit. Such operation can be obtained with what is termed a break-before-make switch. For the application being discussed, the break-before-make switch has, in the absence of a ringing voltage, a normally ON switch which connects the tone generator and station apparatus. It also has a normally OFF switch between the ringing voltage and the station apparatus. When the application of the ringing voltage is desired, the normally ON switch turns OFF before the ringing voltage is applied to the station apparatus. This prevents the ringing voltage from being applied to the tone generator circuit or other central office equipment which may be designed to handle only 48 volts. When the ringing voltage is no longer desired, the normally OFF switch connecting the ringing voltage to the station apparatus opens before the normally ON switch closes and the tone generator voltage is again applied to the station apparatus.

SUMMARY OF THE INVENTION

I have found that a switch having a first and a second FET, each having source, gate and drain electrodes, with their drain electrodes connected to each other and a first photodiode array with a first terminal connected, through first and second blocking diodes, to said FET gate electrodes and a second terminal connected, through third and fourth blocking diodes, to said FET source electrodes, has linear bilateral characteristics. Resistances are connected between the gate and source electrodes of each FET. In one preferred embodiment, the FET is a VMOS FET. The source electrodes may be connected to an electrical output circuit. The photodiode array is optically coupled to a light emitting diode in an electrical input circuit and develops a voltage, when illuminated, sufficient to change the normally OFF current conduction state of the circuit formed by the two VMOS FETs to the ON current conduction state.

This normally OFF bilateral switch may be used by itself or it may be combined with other elements to form switches having additional capabilities. In another preferred embodiment, the switch further comprises a second FET which is normally ON and whose current conduction state is also controlled by the photodiode array. Upon illumination of the photodiode array by the light emitting diode or other suitable light source, the normally ON FET turns OFF before the circuit formed by the normally OFF VOS FETs turn ON resulting in a break-before-make switch.

BRIEF DESCRIPTION OF THE DRAWINGS

Identical elements have identical reference numbers in different figures.

DETAILED DESCRIPTION

Figure 1:
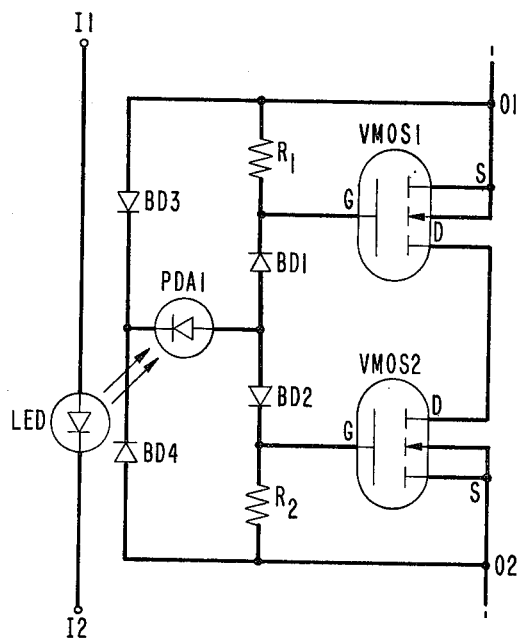
FIG. 1 is a schematic representation of one embodiment of a normally OFF bilateral switch of this invention.

One embodiment of the optically toggled linear bilateral switch of this invention is schematically depicted in FIG. 1. The switch comprises an electrical output circuit having a first and a second VMOS FET indicated as VMOS1 and VMOS2 each having source, gate and drain electrodes. The electrodes are indicated as S, G and D for source, gate and drain, respectively. The drain electrodes are connected to each other. The output circuit further comprises photosensitive means, such as a first photodiode array (PDA1), having a first terminal connected through first blocking diode BD1 to the gate electrode of VMOS1 and through second blocking diode BD2 to the gate electrode of VMOS2, respectively, and a second terminal connected through third blocking diode BD3 to the source electrode of VMOS1 and through fourth blocking diode BD4 to the source electrode of VMOS2, respectively. Resistances R1 and R2 are connected between the source and gate electrodes of VMOS1 and VMOS2, respectively. The source electrodes of VMOS1 and VMOS2 form electrical output circuit terminals 01 and 02 which may be connected to other apparatus in the output circuit. The switch further comprises a light emitting diode (LED) which is optically coupled to the photodiode array and is located in an electrical input circuit having input circuit terminals I1 and I2.

The common drain connection permits the two VMOS FETS to be integrated on a single chip whose substrate is the common drain. This is possible because the drain electrode of a VMOS FET is directly connected to the substrate.

Although depicted with VMOS FETs, it is to be understood that other types of FETs, such as MOS-FETs, may also be used. Resistances R1 and R2 are typically between 100 KΩ and 1 MΩ while PDA1 produces approximately 10.8 volts when illuminated.

The bridge arrangement of the blocking diodes and the photodiode array prevents current conduction, when the LED is OFF, between the VMOS source electrodes, i.e., between terminals 01 and 02, regardless of the relative polarity of the voltage between terminals 01 and 02. When the LED is OFF and the photodiode array does not produce a voltage, no current flows through the VMOS FETs because they do not conduct between the drain and source electrodes in the absence of a gate-source voltage. When the photodiode array is illuminated, it produces a voltage which is applied between the gate and source electrodes of both VMOS FETs because of the diode bridge arrangement. The voltage produced by the illuminated photodiode array is sufficient to make the FETs conduct between their drain and source electrodes. Thus, when the terminal 01 and the source electrode of VMOS1 are positive with respect to terminal 02 and the source electrode of VMOS2, the photodiode array voltage will make the drain-source channel of VMOS2 conducting and when terminal 02 and the source electrode of VMOS2 are positive with respect to terminal 01 and the source electrode of VMOS1, the photodiode array will make the drain source channel of VMOS1 conducting. Thus, the switch conducts in a symmetrical bilateral manner between the source electrode when the LED is ON.

The embodiment depicted in FIG. 1 is able to bilaterally block voltages up to the breakdown voltage, approximately 70 volts, of the VMOS FETs depicted, i.e., 2VN66AK. However, higher voltages may be handled by using VMOS FETs having larger breakdown voltages. Zener diodes may also be substituted for blocking diodes BD3 and BD4.

Figure 2:
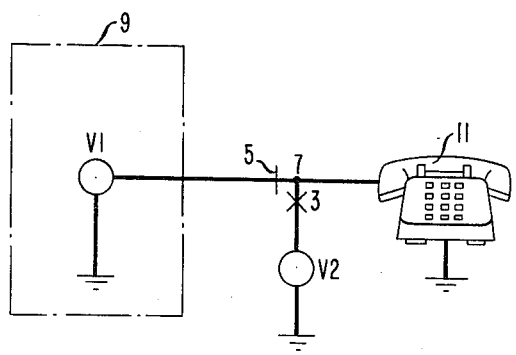
FIG. 2 is a schematic representation of a break-before-make switch.

The circuits schematically represented and described with respect to FIG. 1 may be used in a break-before-make switch. The operation of a break-before-make switch is better understood by reference to and discussion of the circuit schematically depicted in FIG. 2.

The circuit comprises a normally OFF switch 3 and a normally ON switch 5 that are connected to each other at connection 7. Switch 5 is further connected to central office 9 which has a volage source V1. Switch 3 is further connected to voltage source V2. Both switches are connected to station apparatus 11 at connection 7. For purposes of this discussion, it will be assumed that V1 is approximately 48 volts and that V2 is approximately 105 volts. These voltages are commonly used in telephony applications for the tone generator and the ringing voltage, respectively. It is often undesirable to have the ringing voltage applied to the central office. This is prevented by the break-before-make switch formed by switches 3 and 5. Normally ON switch 5 opens before normally OFF switch 3 closes and the ringing voltage reaches station apparatus 11 but not central office 9. When the ringing voltage is no longer desired, switch 3 opens before switch 5 closes.

Figure 3:
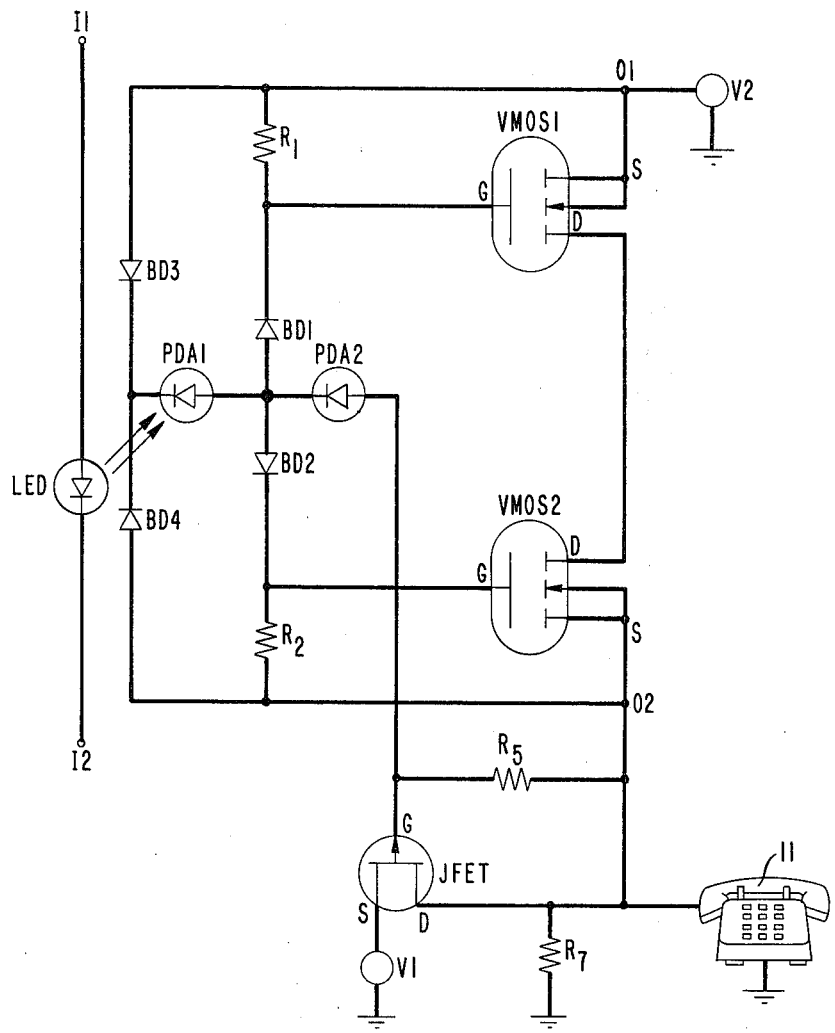
FIG. 3 is a schematic representation of one embodiment of a break-before-make switch.

One embodiment of a break-before-make switch of this invention is schematically depicted in FIG. 3. The switch comprises the elements described with respect to FIG. 1. The switch further comprises a second photodiode array PDA2, resistances 5 and 7, and a first JFET having source, gate and drain electrodes which are indicated as S, G and D, respectively. A typical value of R5 is approximately 1.5 MΩ or larger. The first JFET gate electrode is connected to the second terminal of PDA2 and the drain electrode is connected to one terminal of BD4. The first terminal of PDA2 is connected to the common terminal of BD1 and BD2, i.e., the first terminal of PDA1. Resistance R5 is connected between the first JFET's gate and drain electrodes. Resistance R7 is connected between the drain electrode and ground. Voltage sources V1 and V2 are connected to the source electrodes of first JFET and VMOS1, respectively, and ground and represent the tone generator and ringing voltage, respectively. The source electrode of first JFET forms an output terminal. Station apparatus 11 is connected to the drain electrode of first JFET and to terminal 02. In the embodiment depicted, the first JFET is a p-channel JFET.

The normally OFF porton of the switch operates as did the switch depicted and described with respect to FIG. 1 with its operation controlled by PDA1. The current conduction state of the normally ON p-channel first JFET is controlled by the series circuit formed by PDA1 and PDA2. Consequently, the voltage that is used to pinch off the first JFET will be larger than the voltage used to enhance the two VMOS FETs. This allows for better control of the time interval during which the output voltage is zero.

The operation of the switch depicted in FIG. 3 will be briefly described. Under normal condtions, i.e., no current flowing through the light emitting diode, the switch formed by the two VMOS FETs is OFF and no ringing voltage is applied to station apparatus 11 by voltage source V2. The switch formed by the first JFET is ON. When the LED is turned ON and the photodiode arrays produce a voltage, the first JFET turns OFF before the VMOS FET switch turns ON because of the larger magnitude of the voltage applied to the JFET and the relative values of the resistances of the circuit. Consequently, for a short time interval, the voltage across R7 becomes zero. When the VMOS switch turns ON, the voltage across R7 becomes that of voltage source V2. When the LED is turned OFF, the VMOS FETs turn OFF before the first JFET switch turns ON and consequently, during the short time interval the voltage across R7 remains equal to zero.

Figure 4:
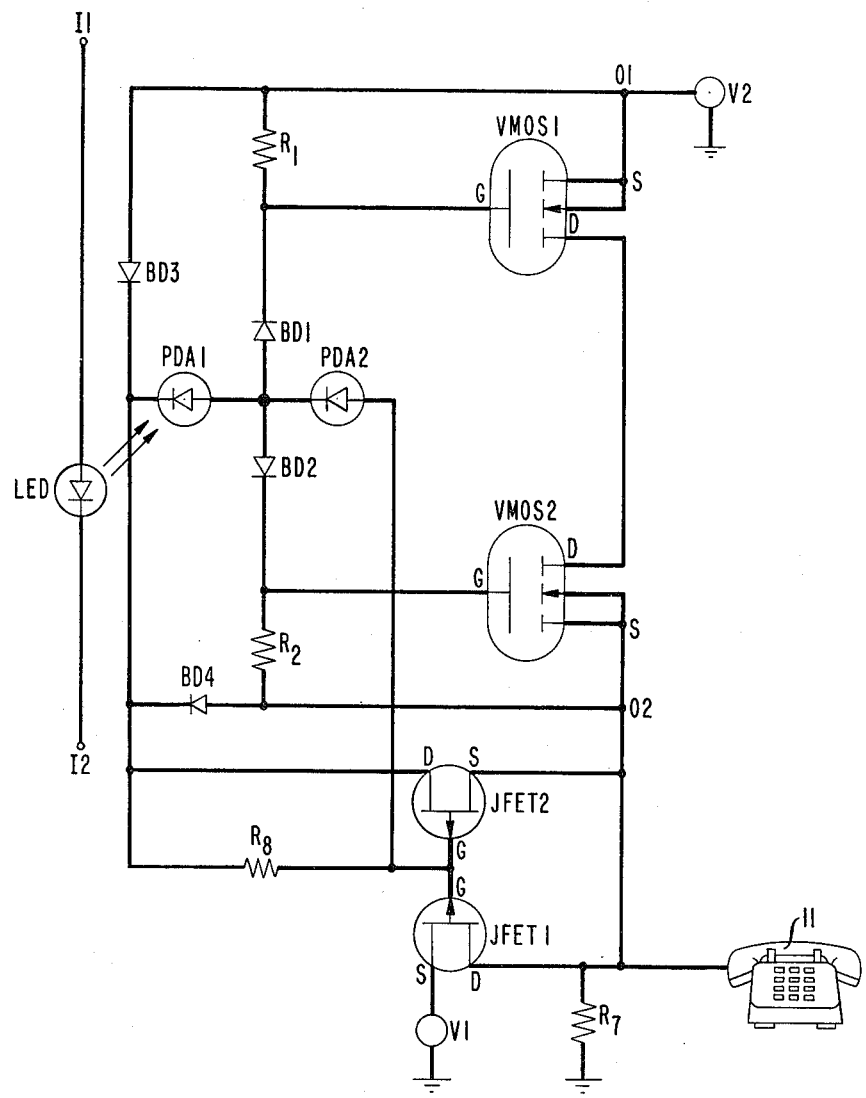
FIG. 4 is a schematic representaton of another embodiment of a break-before-make switch.

Another embodiment of a break-before-make switch is schematically depicted in FIG. 4. The normally OFF portion of the switch is the same as that depicted in FIG. 2. The normally ON version differs from that described with respect to FIG. 3. Resistance R5 is formed by resistance R8 and a second JFET having source, gate and drain electrodes, indicated as S, G and D, respectively. The gate electrodes of the first and second JFETs are connected to each other, the source electrode of the second JFET is connected to the drain electrode of the first JFET, and the drain electrode of the second JFET is connected to the second terminal of PDA1. Resistance R8 is connected to the gate and drain electrodes of the second JFET.

The second JFET, whose current conduction state is controlled by the series circuit formed by PDA1 and PDA2, permits sharper turn-ON characteristics to be obtained and also slightly delays the turn-ON of the first JFET once the LED is turned OFF.

The embodiments specifically depicted and described are for purposes of illustration only and modifications will be thought of by those skilled in the art. For example, the JFET in FIG. 3 may have its current conduction state controlled by a photodiode array or arrays other than PDA1 and PDA2. Precise resistance values needed for the desired timing characteristics will be readily ascertained by those skilled in the art.

What is claimed is:

1. A switch comprising a first photodiode array, said array having first and second terminals, a first and a second field effect transistor (FET), each FET having source, gate and drain electrodes, said drain electrodes being commonly connected, first and second diodes, each being connected to said first terminal of said first photodiode array and said first and second diodes being connected to said gate electrodes of said first and second FETs, respectively, third and fourth diodes each being connected to said second terminal of said first photodiode array and said third and fourth diodes being connected to said source electrodes of said first and second FETs, respectively, and first and second resistances connected between gate and source electrodes of said first and second FETs, respectively.

2. A switch as recited in claim 1 in which said FET is a VMOS FET.

3. A switch as recited in claim 2 further comprising a light source, said photodiode array being optically coupled to said light source.

4. A switch as recited in claim 2 or 3 further comprising a first JFET having source, gate and drain electrodes, said drain electrode being connected to said source electrode of said second FET, and photovoltaic means for changing the current conduction state of said first JFET.

5. A switch as recited in claim 4 in which said photovoltaic means comprises a second photodiode array having a first terminal connected to said first terminal of said first photodiode array and a second terminal connected to said gate electrode of said JFET, said source electrode being an output terminal, and a third resistance connected to said gate electrode of said first JFET and said source electrode of said second VMOS FET.

6. A switch as recited in claim 5 further comprising a second JFET having source, gate and drain electrodes, said gate electrode being connected to said second terminal of said second photodiode array, said drain electrode being connected to said second terminal of said first photodiode array, said source electrode being connected to said drain electrode of said first JFET, and a fourth resistance connected to said drain and gate electrodes of said second JFET.

* * * * *